May 24, 1966 F. X. EDER 3,252,291
CRYO-PUMPS
Filed April 4, 1963 2 Sheets-Sheet 1

INVENTOR.
Franz X. Eder
BY
James L. O'Brien
ATTORNEY.

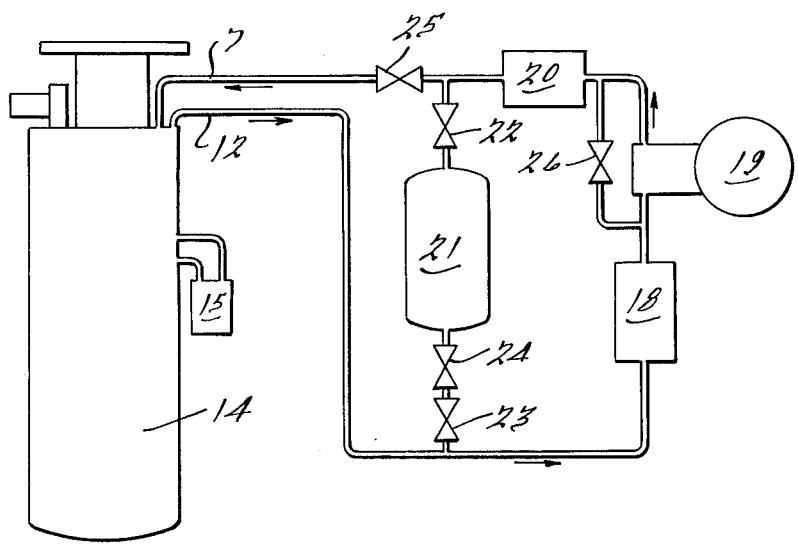

United States Patent Office 3,252,291
Patented May 24, 1966

3,252,291
CRYO-PUMPS
Franz X. Eder, Munich, Germany, assignor to Bendix
Balzers Vacuum, Inc., Rochester, N.Y., a corporation
of Delaware
Filed Apr. 4, 1963, Ser. No. 270,768
4 Claims. (Cl. 62—55.5)

The present invention relates to high vacuum pumps, more particularly to cryo-pumps for removing gases from a receptacle by condensing the same on a surface cooled by a liquified gas such as helium or hydrogen.

The idea of generating high vacua at high removal rates by condensation of the gas to be pumped off is known; and when using baths of liquid hydrogen or helium, a strong pumping action occurs in the vacuum chamber surrounding these baths. This phenomenom is based on the fact that as the gas is condensed on the outer wall of the container, the resultant pressure in the container will be the vapor pressure of the liquid condensate and at the temperatures of 20° K. or 4.2° K., obtained with liquified hydrogen or helium respectively, the condensate freezes and becomes a solid with an accompanying substantial reduction in vapor pressure. This vapor pressure for nitrogen, oxygen and air is about $10^{-20}$ mm. Hg and for hydrogen is about $10^{-7}$ mm. Hg at the temperature of liquid helium under normal pressure.

The pumping process is based on the fact that the molecules to be removed impinge at their thermal velocity on the deeply cooled surface of the condenser and are there retained, i.e. condensed, with a high degree of probability. When the gas to be removed impinges on a deeply cooled surface at a means molecular velocity corresponding to room temperature, the temperature of the gas is reduced to a temperature corresponding approximately to but higher than that of the coolant bath. If the temperature of the cooling surface is denoted $T_w$ and the temperature of the incoming gas flow is denoted $T'$, then the mean temperature $T''$ of the gases after the impact on the wall amounts to $$T'' = (1-\lambda)T' + \lambda T_w$$

where $\lambda$ denotes the so called accommodation coefficient. The value of the accommodation coefficient depends on the nature of gas, on the temperature difference to be transmitted, and on the wall temperature $T_w$. This coefficient is always smaller than unity but approaches unity for many gases, however for hydrogen at $T_w = 4.2°$ K. it is significantly smaller than unity.

On the other hand during the condensation process (sublimation) of the gas, heat is transferred to the cooling surface which is composed of the following:

(1) The cooling of the gas to be condensed to the temperature $T''$, which in this case is equal to $T_w$.

(2) Heat of condensation.

The whole amount of heat is transferred to the liquid bath at the boiling temperature of the coolant liquid used (for hydrogen 20° K., for helium 4.2° K.). This causes a certain quantity of liquid to continuously evaporate, the amount of which can be calculated from the heat of evaporation of the liquid. When a high vacuum is desired from a cryo pump, the condensation surface should be cooled with the liquid helium, which has an extremely low heat of evaporation of 20 Joules per gram. From the point of view of thermodynamics, it is, however, extremely uneconomical to remove the entire enthalpy difference of the gas between room temperature and the temperature of the liquid helium at the lowest possible temperature.

The present invention has the object of providing a high vacuum pump which obviates this disadvantage and which produces a very high vacuum quickly and economically.

With these and other objects which will become apparent later from the present specification and accompanying drawings, I provide a high vacuum pump for evacuating a receptacle or vessel comprising in combination: a suction pipe having one end in communication with the receptacle to be evacuated, a container for a liquified gaseous coolant surrounding the part of said suction pipe remote from said receptacle, and duct means communicating with said container and being disposed in good heat transfer relation with the part of said suction pipe adjacent said receptacle.

Such a pump according to the invention produces the highest possible gas removal rate with the lowest energy consumption, since the gas to be removed is cooled and condensed in a substantially thermodynamic equilibrium. A maximum pressure of about $10^{-3}$ mm. Hg should exist at the pump entrance and the pressure in the condensation zone will be smaller by many orders of magnitude, the quantity of gas to be pumped off flow towards the condensation zone in the form of a molecular flow, i.e. only molecular impacts against the pipe wall occur. At each of these wall impacts, part of the kinetic energy of the gas molecules is delivered to the wall in the form of heat in accordance with the equation given hereinabove. This takes place, as stated, approximately in a thermodynamic equilibrium since the molecules entering at the entrance port of the pump meet a relatively high wall temperature, while the gas particles reflected lower down in the pipe after multiple will impacts meet a correspondingly lower wall temperature until they are eventually condensed.

In order that the invention may be clearly understood an embodiment thereof will be described hereinafter by way of example with reference to the accompanying drawings, wherein:

FIGURE 2 is a circuit diagram of a pumping system.

Figure 1:
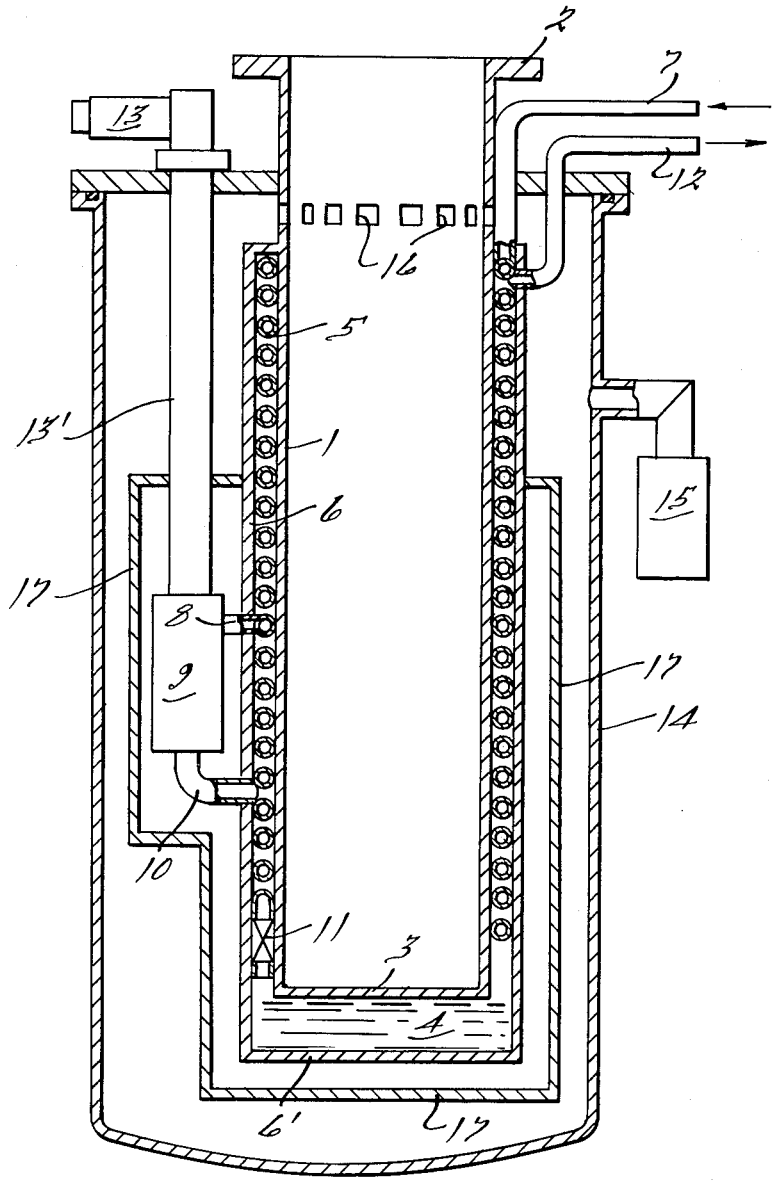
FIGURE 1 shows a longitudinal section of a pump according to the invention.

The cylindrical suction pipe 1 illustrated has at its entry a pump flange 2 and at the other end is closed by the pipe bottom 3, which is bathed on the outside with liquid helium or hydrogen 4. The suction pipe 1 also constitutes the inner surface of a counter-flow heat exchange apparatus which is illustrated for example in FIGURE 1 as a counter flow heat exchanger and consists in a helically coiled high pressure duct means 5 and an outer shell 6, which is co-axial with the pipe 1. The liquefying coolant 4, (helium or hydrogen) accumulated in part or container 6′ of the condenser flows upwardly in the vapor phase in the double walled annular space 1-6, which serves as an evaporator duct means under normal pressure, whereby the high pressure gas introduced from above into the coiled duct means 5 is cooled in counterflow.

In the embodiment illustrated in FIGURE 1, according to a further development of the invention the pump and expansion engine for generating the condensation temperature are structurally combined. However, if liquid helium is available, it suffices to provide the condenser 6′ with a coiled evaporator duct means (similar to duct means 5), which is soldered to the outside of the suction pipe 1 to produce a temperature gradient along said suction pipe 1.

In the embodiment of the invention according to FIGURE 1, there exists a combination of a cryo-pump and a helium expansion engine 9, in which the counter-flow heat exchanger required for the refrigerating purposes also serves as the pump pipe, the temperature of which is always between the ambient temperature and the temperature of boiling helium. The structural embodiment illustrated in FIGURE 1 uses a conventional thermodynamic refrigerating machine the refrigerating capacity of which is provided by a piston expansion engine 9. The high pressure gas of 10–30 atm. pressure enters at 7 into a coiled high pressure 5 of the counter-flow heat exchanger, and is cooled in counter-flow by the helium 4 evaporating from the condenser 6'. Part of the high pressure gas flow branched off at 8 is expanded in the piston expansion engine 9 approximately to atmospheric pressure, whereby it assumes a temperature substantially lower than the entrance temperature, and is mixed at 10 to the returning low pressure gas flow. The part of the high pressure gas not flowing through the expansion engine is reduced to normal pressure adiabatically in valve 11, whereby further cooling and partial liquefaction of the helium takes place due to the Joule-Thomson effect with a sufficiently low pre-cooling temperature. During pump operation, liquid accumulates in the condenser 6' and evaporates in the double walled annular space 1–6 of the counter-flow heat exchanger, and leaves by the duct at 12 approximately at ambient temperature. The mechanical output of the expansion machine 9 acting as a refrigerating machine, is passed outside of the pump by a push- or pull-rod and is consumed e.g. by means of a loaded electric generator 13. The suction pipe 1 counter-flow heat exchanger 1–6 and 5 and expansion engine 9 are arranged, for reasons of the required thermal insulation within a vacuum casing 14 which is evacuated by a continuously operating diffusion pump system 15. The diffusion pump system 15 withdraws gas from the interior of suction pipe 1 through suction ports or slots 16 adjacent the upper, comparatively warm end of the suction pipe 1 in order to generate a suitable starting pressure for the operation of the cryo-pump and to lower the partial pressure of gases which are difficult to condense.

For reasons of simplification of operation the expansion valve 11 can be constructed as an automatic valve pneumatically or spring biased to open only above a predetermined pressure, and which accurately meters the quantity of gas to be expanded. For large capacity pumps, the piston engine 9 may be replaced by a small expansion turbine, the power of which is consumed electrically or by a blower. In order to reduce radiation losses, the counter-flow heat exchanger 1–6 and 5, the liquid container 6' and the expansion engine 9, which are at comparatively low temperatures, are surrounded by a radiation screen 17 of copper, which is soldered at a suitable place to the outer casing 6 of the counter-flow heat exchanger and may be at a temperature of about 80–100° K.

If the desired final pressure of the gases to be removed can be attained at a sufficiently fast removal rate at about 20° K., hydrogen or even neon may be used as the coolant gas instead of helium. If the condensation surface is to be cooled to a temperature higher than 4° K., the expansion engine 9 may be connected so that the entire gas quantity passes through it rather than in a by-pass relation to the counter-flow heat exchanger. The lowest temperature attainable in this case corresponds to the outlet temperature of the expansion engine. In this case the bottom 3 of the tube pipe 1 must be provided with a heat exchanger which is connected to the outlet 10 of the expansion engine 9. The advantage of such a series arrangement consists in reducing the power output required to produce the same refrigerating capacity.

A further development of the invention is concerned with the gas circuit outside the cryo-pump proper. The low pressure gas which escapes at approximately ambient temperature at duct 12 is removed—as illustrated in FIGURE 2—by a compressor 19, with the interposition of a low pressure compensating reservoir 18 and is compressed to the pressure required. The high pressure gas passes in a circuit through a high pressure compensating reservoir 20 (for reducing the pressure fluctuations), via 7 again to the cryo-pump 15, in order to obviate a low pressure gas reservoir of generally large dimensions as required for the usual gas liquefying plants. The plant according to the present invention contains a high pressure reservoir 21, which is connected to the compressor through a by-pass via the check valves 22 and 23, as well as a pressure reduction valve 24. The reduction valve 24, is so adjusted that with the valve 22 closed and valve 23 open, practically the whole gas quantity is in circulation, and therefore the pressure in the reservoir 21 corresponds to the low pressure. When the cryo-pump is to be shut-down, a further valve 25 as well as the said valve 23 are closed (valve 22 being open), and the quantity of gas contained in the pump is forced by the compressor 19 into the reservoir 21. This process is terminated when the cryo-pump has attained the ambient temperature and almost the whole gas quantity in circulation is stored under high pressure in the reservoir 21. Thereafter, the valve 22 has to be closed and the by-pass valve 26 opened, and the compressor to be switched off. With the aid of suitable pressure guages and electro-magnetically actuated valves the aforesaid operation of switching off the pump may be carried out automatically if desired.

In operation, the suction pipe 1 is attached by means of pump flange 2 to the receptacle or vessel from which gas is to be evacuated. Diffusion pump system 15 operates to withdraw gas through slots 16 to maintain the entering gas pressure at the inlet of suction pipe 1 at a value below $10^{-3}$ mm. Hg so that the gas flowing in pipe 1 toward the lower pressure zone at condensing surface 3 flows by molecular flow in which the gas molecules make repeated contact with walls of pipe 1 as they traverse the length of the pipe 1. The flow of high pressure gas in duct 5 and the counter flow of vapor returning through the double walled annular space 1–6 creates a temperature gradient along the wall of pipe 1 with the highest temperature being at the inlet and the lowest temperature being at the condensing surface 3. As the gas molecules flow through the pipe 1, heat is transferred at each impact to the wall of the pipe with a relatively small temperature differential existing between the gas temperature and the wall temperature whereby the gas is progressively cooled and condensed under conditions approaching thermodynamic equilbrium. In this manner the gas to be removed is cooled very quickly with a minimum amount of cooling gas.

The invention concerns moreover the prevention of a loss in suction capacity of the cyro-pump after prolonged operation or operation at comparatively high suction pressures. In this case the layer of the condensate becomes so thick that a higher temperature will exist at its surface than that at the cooling surface 3 (FIGURE 1), and as a consequence the pump capacity diminishes. The reason for this is the low thermal conductivity of amorphous layers of solidified air, nitrogen, and the like is considerably worse than that of crystalline layers of the same substances. Such a loss in suction capacity may be obviated by temporarily warming the condensing surface 3 by appropriate control of the coolant circuit to such an extent that the condensate reaches the recrystallization temperature and thereby becomes more heat conductive. Subsequently the coolant circuit is readjusted to obtain the lowest temperature for the best suction capacity.

In the embodiment herein described in detail the bottom 3 of the pipe 1 serves as a condensation surface. It would, however, be obvious to a person skilled in the art that this bottom of the pipe may be constructed, if desired, as a plate valve which controls the suction duct at this point, which suction duct may be alternatively connected to a pre-vacuum pump. In this case it is not necessary (and would be structurally involved), to cool the plate valve itself by means of liquid helium, or hydrogen; it suffices when part of the cooled wall surface is at a sufficiently low temperature in order to effect condensation.

Obviously a suction pipe according to the invention need not necessarily have a circular cross section but may have other shapes; for example suction pipes with annular cross sections may be used in which case the inner as well as the outer boundary wall may be cooled to low temperatures. By building baffle plates into the suction duct which are connected with the cooled walls in a good heat transfer relation or directly cooled, the effective length of the suction pipe and the probability of impacts on the wall surface may be increased and accordingly the conditions for the condensation at a thermodynamic equilibrium may be further improved.

In order to increase the gas removal rate, several pumps may be connected in parallel in the present invention as has been done in other arrangements before, in which case several suction pipes arranged in parallel to one another may be conveniently combined with a single refrigerating engine into a cryo-pump of a high suction capacity.

While I have herein described what may be considered a typical and particularly useful embodiment of my said invention, I wish it to be understood that, I do not limit my invention to the particular details and dimensions described and illustrated, for obvious modifications will occur to a person skilled in the art.

What I claim as my invention and desire to secure by Letters Patent is:

1. A high vacuum pump having a source of gas for evacuating a vessel comprising: a suction pipe having a closed end and an open end, said open end being adapted for communication with said vessel, first duct means having an inlet and an outlet mounted in heat transfer relation to said suction pipe, the inlet of said first duct means being closer to said outlet to said open end of said pipe, connecting means adapted to connect said inlet to said source of gas, expansion means connected to said first duct means for cooling the gas therein, a container disposed in heat transfer relation to the closed end of said pipe and connected to the outlet of said first duct means to receive liquified gaseous coolant, and second duct means disposed in heat transfer relation to said pipe and to said first duct means and connected to said container for conveying gas therefrom in counter flow heat transfer relation to said suction pipe and first duct means.

2. A high vacuum pump as claimed in claim 1, having an outer vacuum casing enclosing said container and said pipe, and pumping means connected to said casing and said pipe for reducing the pressure therein.

3. A high vacuum pump as claimed in claim 1, in which the expansion means includes a low temperature expansion engine mounted within said casing and an expansion valve.

4. A method for operating a high vacuum pump using a liquified gaseous coolant to remove gas from a vessel comprising the steps of expanding a high pressure gaseous coolant, adiabatically cooling said coolant to liquefying temperature, condensing the gas to be removed through heat transfer with said coolant, forming a layer of condensed gas of predetermined thickness and increasing the temperature of the condensed gas layer to the recrystallization temperature of said condensed gas layer, when the predetermined thickness has been reached.

References Cited by the Examiner

UNITED STATES PATENTS

| | | | |
|---|---|---|---|
| 1,963,922 | 6/1934 | Robinson | 62—54 |
| 2,346,253 | 4/1944 | De Motte | 62—50 X |
| 2,909,908 | 10/1959 | Pastuhov et al. | 62—514 |
| 2,967,961 | 1/1961 | Heil | 62—514 |
| 2,986,893 | 6/1961 | Skaredoff | 62—54 |
| 3,021,683 | 2/1962 | McInroy | 62—514 |
| 3,055,192 | 9/1962 | Dennis | 62—514 |

FOREIGN PATENTS 861,111   2/1961   Great Britain.

MEYER PERLIN, *Primary Examiner.*

ROBERT A. O'LEARY, *Examiner.*

L. L. KING, *Assistant Examiner.*